H. D. LAUSON.
CLUTCH MECHANISM.
APPLICATION FILED APR. 25, 1908.
918,562.
Patented Apr. 20, 1909.
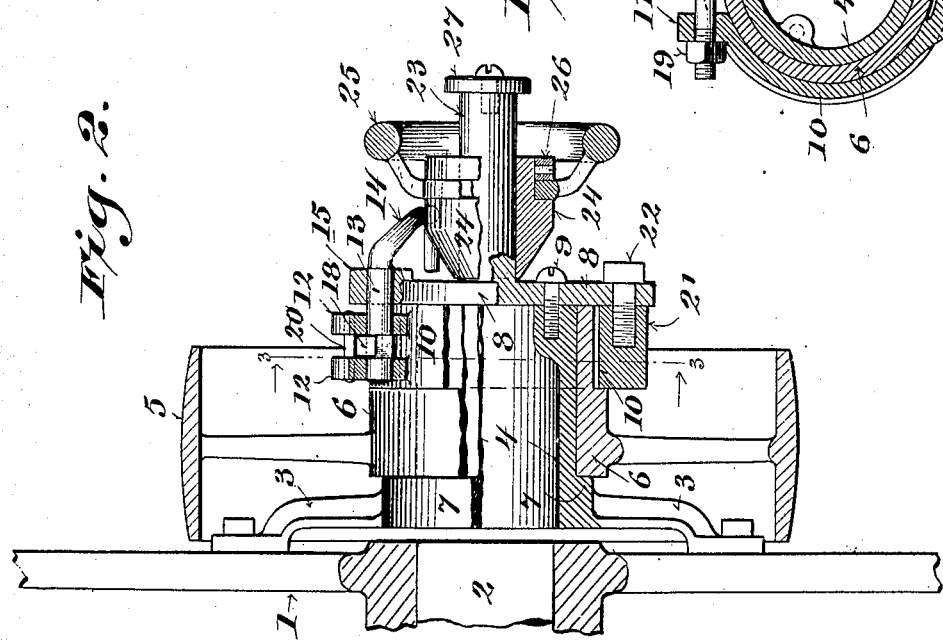
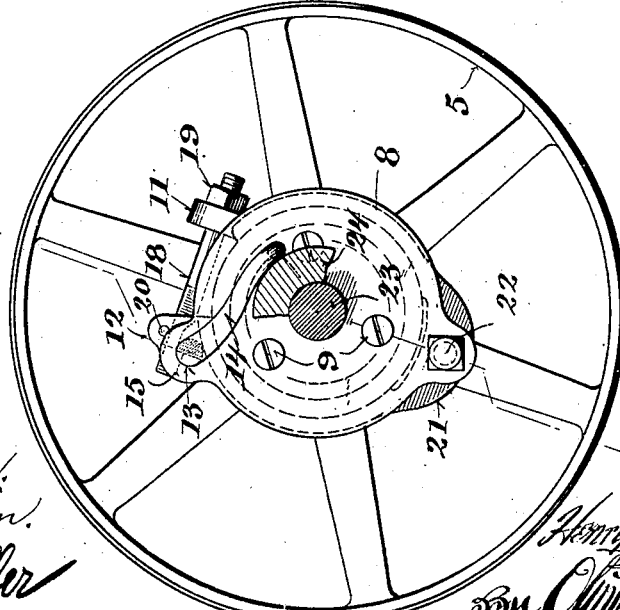
Witnesses:
Ralph Nelson
George Felber
Inventor:
Henry D. Lauson
By Oliphant & Young
Attorneys

UNITED STATES PATENT OFFICE.

HENRY D. LAUSON, OF NEW HOLSTEIN, WISCONSIN, ASSIGNOR TO THE JOHN LAUSON MANUFACTURING COMPANY, OF NEW HOLSTEIN, WISCONSIN.

CLUTCH MECHANISM.

No. 918,562.      Specification of Letters Patent.      Patented April 20, 1909.

Application filed April 25, 1908. Serial No. 429,180.

*To all whom it may concern:*

Be it known that I, HENRY D. LAUSON, a citizen of the United States, and resident of New Holstein, in the county of Calumet and State of Wisconsin, have invented certain new and useful Improvements in Clutch Mechanism; and I do hereby declare that the following is a full, clear, and exact description thereof.

The object of my invention is to provide simple and effective friction-clutch mechanism for power transmission elements, it being especially applicable to the hubs of loose-pulleys.

The invention consists in various details of construction and combination of parts as hereinafter fully set forth with reference to the accompanying drawings and subsequently claimed.

In the drawings: Figure 1 represents a front elevation of a pulley equipped with a clutch-mechanism embodying the features of my invention, parts being broken away and in section to better illustrate the details; Fig. 2, a side elevation of the same partly broken away and in section, as indicated by line 2—2 of the preceding figure, and Fig. 3, a detail sectional view of the clutch-members, the section being indicated by line 3—3 of Fig. 2.

Referring by numerals to the drawings, 1 indicates a fragment of a fly-wheel fast on a shaft 2, and secured to the spokes of the fly-wheel by spider-arms 3 is a sleeve 4, upon which sleeve is loosely mounted a loose pulley 5. The hub 6 of the pulley is held against end-play between a shoulder 7 of the sleeve 4 and a flange 8, which flange is secured to the end of said sleeve by bolts or screws 9 in threaded engagement with internal lugs of the aforesaid sleeve. A portion of the exterior face of the pulley adjacent the flange 8 is reduced for the reception of a split friction-band 10, one end of which band is provided with a projecting apertured lug 11, while its opposite end terminates with a pair of ears 12 disposed at a right-angle to the lug. These ears are also apertured and serve as bearings for the shank 13 of a lever 14, said shank being also loosely mounted in a coinciding apertured ear 15 of the flange constituting a fixed bearing for the aforesaid shank. That portion of the lever shank between the ears 12, is cut away to form a tooth 16 for engagement with the notched head 17 of a bolt 18, the opposite end of the bolt being threaded and extends through the apertured lug 11 of the band 10, to which lug is adjustably secured by a nut 19, as shown. The head 17 of the bolt is held in engagement with the tooth 16 of the lever shank by a pin 20, that is secured to the ears 12 and rests upon the upper side of said head. By providing the lever shank with a positive bearing in the flange 8 as described, the said lever is prevented from twisting when subjected to strain by the cone and is thus provided with a fixed fulcrum in opposition to the draw of the band upon the pulley-hub.

The friction-band 10 constitutes a pair of annular gripping jaws for the pulley hub, which jaws extend from a lug 21 of said band that is secured to the flange 8 by a bolt 22, the bolt being passed through an aperture of said flange and is in threaded connection with the lug. A stud 23 projects from the flange and is connected with the sleeve for the reception of a cone 24, which cone is reciprocative thereon and is provided with a hand-wheel 25 for the purpose of manually operating the same. The hand-wheel is secured in position upon a reduced end of the cone by a collar 26 fast thereto, motion of said cone upon the stud being limited in one direction by a cap 27 fast on the end of said stud.

Normally the end of lever 14 rests upon or adjacent to the face of the stud 23 and in the reciprocative path of the cone, which cone is drawn out upon said stud until checked by the cap 27. In this position the pulley is free to revolve independently of the sleeve. Should the cone be pushed up to the position, as shown in Fig. 2, the lever end would rise as it travels over the conical surface causing a slight rotation of its shank, which shank owing to its toothed engagement with the bolt 18 would cause a drawing upon the jaw-members of the band, that in turn would securely grip the pulley-hub upon the sleeve, thus locking the parts and causing said pulley to revolve with the fly-wheel to which it is attached.

While the sleeve is shown as attached by a spider to arms of a fly-wheel, it is understood that in some instances said sleeve may be secured directly upon a driven shaft with the same results, in which case if the shaft be overhead, a spanner-lever may be attached to the cone in place of the hand-wheel, the cone being directly mounted upon the shaft.

The construction as shown in the drawings, is designed particularly for gas-engines or the like, wherein a pulley is attached directly to the fly-wheel and except as far as this particular adaptation of my invention is concerned, the spider-portion of the sleeve may be dispensed with.

I claim:

1. A clutch-mechanism comprising a rotatory sleeve having an apertured flange extension, a hub mounted on the sleeve, a split-band fitted over the hub in rigid connection with the flange extension, a pair of apertured ears extending from one end of the split-band coincident with the aperture of said flange extension, an apertured lug extending from the other end of said split band, a lever having a fixed bearing in the aperture of the aforesaid flange extension and the apertures of the pair of band ears, the lever being provided with a tooth intermediate of said pair of band ears, a bolt in adjustable connection with the opposite apertured lug of said split-band, the bolt being provided with a notched head for the tooth of the lever, and a reciprocative cone for engagement with said lever.

2. A clutch-mechanism comprising a rotatory shaft having a shouldered sleeve in rotatory connection therewith, an apertured flange-extension extending from the sleeve, a pulley having its hub loosely mounted upon the sleeve, between the shoulder and flange thereof, a split-band fitted over the hub in rigid connection with the sleeve flange, a pair of apertured ears extending from one end of the split-band coincident with the sleeve flange aperture, an apertured lug extending from the opposite end of said split-band, a lever having a fixed bearing in said sleeve flange aperture and also in the pair of apertured ears of the aforesaid split-band, the lever being provided with a tooth intermediate of the pair of band ears, a bolt in adjustable connection with the opposite apertured lug of said band, the bolt being provided with a notched head for engagement with the lever tooth, a retaining pin for the bolt head in connection with the pair of band ears, and a reciprocative cone for engagement with the band ears.

3. A fly-wheel, a shouldered sleeve provided with spider arms secured to the fly-wheel, an apertured flange extending from the sleeve, a pulley having a hub loosely mounted upon said sleeve between the shoulder and flange thereof, a split-band fitted over the hub in rigid connection with the flange-extension, a pair of apertured ears extending from one end of the split-band coincident with the aperture of said flange extension, an apertured lug extending from the outer end of said split-band, a lever having a fixed bearing in the aperture of the aforesaid flange-extension and the apertures of the pair of band ears, the lever being provided with a tooth intermediate of said pair of band ears, a bolt in adjustable connection with the opposite apertured lug of said split-band, the bolt being provided with a notched head for engagement with the tooth of the lever, and a reciprocative cone for engagement with said lever.

In testimony that I claim the foregoing I have hereunto set my hand at New Holstein, in the county of Calumet and State of Wisconsin in the presence of two witnesses.

HENRY D. LAUSON.

Witnesses:
CHAS. L. KEEFE,
ED. FUNKE.